(12) United States Patent
Angiolillo et al.

(10) Patent No.: US 7,917,583 B2
(45) Date of Patent: Mar. 29, 2011

(54) TELEVISION INTEGRATED CHAT AND PRESENCE SYSTEMS AND METHODS

(75) Inventors: Joel S. Angiolillo, Weston, MA (US); Piotr Boni, Providence, RI (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 702 days.

(21) Appl. No.: 11/356,056

(22) Filed: Feb. 17, 2006

(65) Prior Publication Data

US 2007/0198738 A1 Aug. 23, 2007

(51) Int. Cl.
*G06F 15/16* (2006.01)
*H04N 7/173* (2006.01)

(52) U.S. Cl. .................. 709/204; 709/206; 725/105

(58) Field of Classification Search .................. 709/204, 709/206, 231; 725/32, 105; 348/552
See application file for complete search history.

(56) References Cited

U.S. PATENT DOCUMENTS

| | | | |
|---|---|---|---|
| 4,918,603 A | 4/1990 | Hughes et al. |
| 5,018,736 A | 5/1991 | Pearson et al. |
| 5,846,132 A | 12/1998 | Junkin |
| 5,860,862 A | 1/1999 | Junkin |
| 5,971,854 A | 10/1999 | Pearson et al. |
| 6,009,355 A | 12/1999 | Obradovich et al. |
| 6,165,071 A | 12/2000 | Weiss |
| 6,193,610 B1 | 2/2001 | Junkin |
| 6,280,323 B1 | 8/2001 | Yamazaki et al. |
| 6,324,694 B1 | 11/2001 | Watts et al. |
| 6,371,855 B1 | 4/2002 | Gavriloff |
| 6,442,598 B1 | 8/2002 | Wright et al. |
| 6,565,084 B1 | 5/2003 | Katz et al. |
| 6,669,565 B2 | 12/2003 | Liegey |
| 6,688,978 B1 | 2/2004 | Herman |
| 6,733,383 B2 | 5/2004 | Busse et al. |
| 6,749,198 B2 | 6/2004 | Katz et al. |
| 6,760,595 B2 | 7/2004 | Inselberg |
| 6,773,350 B2 | 8/2004 | Yoshimi et al. |
| 6,774,926 B1 | 8/2004 | Ellis et al. |
| RE38,600 E | 9/2004 | Mankovitz |
| 6,811,484 B2 | 11/2004 | Katz et al. |
| 7,001,279 B1 | 2/2006 | Barber et al. |
| 7,120,871 B1 | 10/2006 | Harrington |
| 7,123,930 B2 | 10/2006 | Inselberg |
| 7,159,235 B2 | 1/2007 | Son et al. |
| 7,178,158 B2 | 2/2007 | Nishina et al. |
| 7,243,139 B2 | 7/2007 | Ullman et al. |

(Continued)

FOREIGN PATENT DOCUMENTS

CN 1517930 A 8/2004

(Continued)

OTHER PUBLICATIONS

Michael, Bill and Jainschigg, John, "Instant Messaging," Call Center, Jan. 5, 2001, <http://www.cconvergence.com/GLOBAL/stg/commweb_shared/shared/article/showArticle.jhtml?articleId=8700996&pgno=1>, (4 pages).

(Continued)

*Primary Examiner* — Larry Donaghue
*Assistant Examiner* — Brian J Gillis (57) ABSTRACT

An enhanced television system which enables users to communicate using a television, both via messaging and telephone. Users or the system may create a buddy list. Users may send and receive program information to and from each other, and change programs based on received information. The system may maintain information regarding a user's presence on the system, availability for messaging, and television viewing.

30 Claims, 9 Drawing Sheets

U.S. PATENT DOCUMENTS

| | | | |
|---|---|---|---|
| 7,346,556 | B2 | 3/2008 | Upendran et al. |
| 7,409,437 | B2 | 8/2008 | Ullman et al. |
| 7,631,327 | B2 | 12/2009 | Dempski et al. |
| 2002/0059621 | A1 | 5/2002 | Thomas et al. |
| 2002/0089610 | A1 | 7/2002 | Ohno et al. |
| 2002/0138843 | A1 | 9/2002 | Samaan et al. |
| 2002/0142842 | A1 | 10/2002 | Easley et al. |
| 2002/0157099 | A1 | 10/2002 | Schrader et al. |
| 2002/0157101 | A1 | 10/2002 | Schrader et al. |
| 2002/0166123 | A1 | 11/2002 | Schrader et al. |
| 2003/0005446 | A1 | 1/2003 | Jaff et al. |
| 2003/0229900 | A1 | 12/2003 | Reisman |
| 2004/0017396 | A1 | 1/2004 | Werndorfer et al. |
| 2004/0031058 | A1 | 2/2004 | Reisman |
| 2004/0139233 | A1 | 7/2004 | Kellerman et al. |
| 2004/0168187 | A1 | 8/2004 | Chang |
| 2004/0194137 | A1 | 9/2004 | Shreesha |
| 2004/0198495 | A1 | 10/2004 | Cisneros et al. |
| 2004/0231003 | A1* | 11/2004 | Cooper et al. ............... 725/135 |
| 2005/0028208 | A1 | 2/2005 | Ellis et al. |
| 2005/0066362 | A1 | 3/2005 | Rambo |
| 2005/0066364 | A1* | 3/2005 | Rambo .......................... 725/43 |
| 2005/0076362 | A1 | 4/2005 | Dukes et al. |
| 2005/0086358 | A1 | 4/2005 | Rosenberg |
| 2005/0091694 | A1 | 4/2005 | Rambo |
| 2005/0108767 | A1* | 5/2005 | Ma ............................... 725/105 |
| 2005/0246757 | A1 | 11/2005 | Relan et al. |
| 2005/0262542 | A1 | 11/2005 | DeWeese et al. |
| 2006/0039361 | A1 | 2/2006 | Ohno et al. |
| 2006/0123455 | A1 | 6/2006 | Pai et al. |
| 2006/0137015 | A1 | 6/2006 | Fahrny et al. |
| 2006/0183547 | A1 | 8/2006 | McMonigle |
| 2007/0028287 | A1 | 2/2007 | Yamamoto et al. |
| 2007/0060380 | A1 | 3/2007 | McMonigle et al. |
| 2007/0061837 | A1 | 3/2007 | Dadush |
| 2007/0107019 | A1 | 5/2007 | Romano et al. |
| 2007/0115845 | A1* | 5/2007 | Hochwarth et al. .......... 370/252 |
| 2007/0124795 | A1 | 5/2007 | McKissick et al. |
| 2007/0129123 | A1 | 6/2007 | Eryou et al. |
| 2007/0157281 | A1 | 7/2007 | Ellis et al. |
| 2007/0199018 | A1 | 8/2007 | Angiolillo et al. |
| 2007/0199019 | A1 | 8/2007 | Angiolillo et al. |
| 2007/0199025 | A1 | 8/2007 | Angiolillo et al. |
| 2007/0204308 | A1 | 8/2007 | Nicholas et al. |
| 2008/0140406 | A1 | 6/2008 | Burazerovic et al. |

FOREIGN PATENT DOCUMENTS

| | | |
|---|---|---|
| EP | 1489800 | 12/2004 |
| WO | WO 01/46818 | 6/2001 |
| WO | WO 02/19701 | 3/2002 |

OTHER PUBLICATIONS

"Instant Messaging and Presence," SIP Showcase, accessed Oct. 27, 2005, <http://www.sipcenter.com/sip.nsf/html/Instant+Messaging+and+Presence>, (2 pages).

Regan, Tim and Todd, Ian, "Media Center Buddies: Instant Messaging around a Media Center," Technical Report MSR-TR-2004-47, Microsoft Research, Jun. 2, 2004, <http://research.microsoft.com/research/pubs/view.aspx?type=Technical%20Report&id=751> (9 pages).

"Comcast and Microsoft Announce Agreement to Trial Microsoft TV Software," Microsoft TV Press Release, Jul. 21, 2003, <http://www.microsoft.com/tv/content/PressReleases/MSTVComcastPR.mspx> (2 pages).

"AINGR: Switch—Service Control Point(SCP)/Adjunct Interface," Telcordia Technologies Generic Requirements GR-1299-CORE, Issue 7, Nov. 2001, (542 pages).

"AINGR: Switching Systems," Telcordia Technologies Generic Requirements GR-1298-CORE, Issue 7, Nov. 2001, (2206 pages).

Handley, M., Schulzrinne, H., Schooler, E., and Rosenberg, J., "RFC 2543—SIP: Session Initiation Protocol," The Internet Society, Mar. 1999, (132 pages).

Rosenberg, J., "RFC 3856—A Presence Event Package for the Session Initiation Protocol (SIP)," The Internent Society, Aug. 2004, (25 pages).

Fujimoto, S., Sugano, H., Klyne, G., Bateman, A., Carr, W., and Peterson, J., "RFC 3863—Presence Information Data Format (PIDF)," The Internet Society, Aug. 2004, (31 pages).

International Search Report and Written Opinion dated Jul. 28, 2008 issued for international application No. PCT/US07/03908, 11 pages.

"Fantasy Sports Trade Association" <http://www.fsta.org/index.shtml> (accessed Aug. 26, 2005).

Batts, Battino, "Sports Fans become CEOs in Multibillion-Dollar Fantasy Leagues," Virginian-Pilot, Knight Ridder/Tribune Business Review, Sep. 26, 2004.

"Fantasy Sports is our Undiscovered Game," Jul. 26, 2004, <http://www.electronicgamingbusiness.com>.

Tedeschi, Bob, "Advertisers Discover the Value of Young Men with Time and Money to Spend on Fantasy Sports on the Web," New York Times, Aug. 23, 2004, p. C7.

Kessler, Scott, "Hot Players in Online Gaming," Business Week Online, May 24, 2004, <http://www.businessweek.com/investor/content/may2004/pi20040524_2927_pi044.htm>.

Hurtt, Rob, "Get in the Game: Think You Know Football? Put it to Use. Fantasy Leagues Have Something to Offer Every Fan, Even Old-Schoolers," The Sporting News, Aug. 30, 2004.

Wendel, Tim, "How Fantasy Games Have Changed Fans," USA Today, <http://www.usatoday.com/news/opinion/editorials> (posted Sep. 19, 2004).

Delaney, Kevin, "Fantasy Sports Lures AOL, Electronic Arts as More Fans Join In", Wall Street Journal, Sep. 9, 2004, p. B1.

Arthur, Bruce, "It's Fantasy-astic: Fantasy Football has Become a Monster in North America, Which Explains My Sudden Interest in Guys Named Morten," National Post, Toronto Edition, Sep. 27, 2004, p. S2.

Levy, Paul, "The Teams Aren't Real, but Money Is: Fantasy Sports have Caught Corporations' Attention," Minneapolis Star Tribune, Aug. 29, 2004, p. 1A.

Hoffarth, Tom, "Fantasy Football is TV's Reality," The Daily News of Los Angeles, Sep. 10, 2004, p. S2.

Warley, Stephen, "Sports iTV: The Sporting News," Oct. 23, 2002, <http://www.tvspy.com/nexttv/nexttvcolumn.cfm?t_nexttv_id=581 &page=1&t_content_cat_id=10>.

Page from www.tivo.com/4.9.5.asp for Digital Photo Viewer Printed Aug. 16, 2005 (1 page).

Page from www.snapfish.com for Snapfish Printed Aug. 16, 2005 (1 page).

Page from www.ofoto.com for Kodak EasyShare Gallery Printed Aug. 16, 2005 (1 page).

Page from http://photos.yahoo.com for Yahoo! Photos Printed Aug. 16, 2005 (1 page).

"Microsoft TV Photo Viewer Provides a Simple New Way to View Digital Photos on Home Television Sets," www.microsoft.com/presspass/features/2001/sep01/09-20tvphotoviewer.mspx Printed Aug. 16, 2005 (2 pages).

"Interactive TV stuck in zip?" Printed Aug. 25, 2005 from http://www.mediaweek.co.uk/articles/2004/7/20/InteractiveTVstuckinzip (4 pages).

"Welcome to the Honda Multimedia" Printed on Aug. 25, 2005 from http://www.honda.co.uk/multimedia/ (1 page).

"Honda Interactive TV Campaign to Explain New IMA Technology" Printed Aug. 25, 2005 from http://www.e-consultancy.com/about/press.asp?id=166 (3 pages).

"Zip TV Debuts With Interactive Content for Honda Campaign" Printed on Aug. 25, 2005 from http://www.aiada.org/article.asp?id=20603 (2 pages).

Tawani et al., "Context Aware Personalized Ad Insertion an Interactive TV Environment" (6 pages), Satyam Computer Services Limited. Printed Aug. 25, 2005 from http://www.di.unito.it/~liliana/TV04/FINAL/thawani.pdf.

"Wink Communications Launching Interactive TV Commercials" (4 pages). Printed Aug. 31, 2005 from www.clickz.com/news/article/pp/16761.

"ZIP TV Channel Launches with Exclusive Honda Video" (24 pages). Printed Aug. 31, 2005 from www.immediatefuture.co.uk/296.

"BBC, Channel 4 and ITV to Extend Audio Description Service," Jun. 21, 2004, http://www.bbc.co.uk/pressoffice/pressreleases/stories/2004/06_june21/audio.shtml, (2 pages).

"Audio Descriptions," Newsletter for Apr. 2004, <http://www.eabnet.org.uk/knowitall/finally/teabreak/newsletters/April/April2004.htm> (accessed Jul. 5, 2005), (4 pages).

"TV for the Blind—New Audio Description Tool Changes TV Experience," Netgem Press Release, Jan. 13, 2004, <http://www.netgemdirect.com/files/homepage/tvfortheblind>, (2 pages).

Netgem i-Player AD, <http://www.netgemdirect.com/default.asp?action=produit&id_prod=5> (accessed Jul. 6, 2005), (1 page).

"Five to Use BskyB's Audio Description Technology," British Sky Broadcasting Group Press Release, Nov. 18, 2003, <http://www1.sky.com/disability/release2.htm>, (2 pages).

"An Introduction to Screen Readers," Printed Jul. 19, 2007, from http://web.archive.org/web/20040404135336/http://mason.gmu.edu/~swidmaye/portfolio/edit797assistivetech.htm (5 pages).

Speir, Michelle, "Screen Readers Open Windows for the Blind," Printed Jul. 19, 2007, from http://www.fcw.com/fcw/articles/2000/0807/cov-access3-08-07-00.asp, (3 pages).

"Alternative Web Browsing," Printed Jul. 19, 2007, from http://www.w3.org/WAI/References/Browsing.html, (4 pages).

Written Opinion, dated Dec. 13, 2007, issued for International Application No. PCT/US07/03909 (4 pages).

Written Opinion, dated Aug. 25, 2008, issued for International Application No. PCT/US07/03907 (5 pages).

"That Wonderful Honda Ad" (6 pages). Printed on Aug. 25, 2005 from http://battellemedia.com/archives/000137.php.

"Interactive TV Advertising: Turning Viewers Into Direct Leads Without A Set-Top Box" (4 pages). Printed Aug. 25, 2005 from http://www.broadcastpapers.com/data/IKSInteractiveTV02.htm.

U.S. Unpublished Appl. No. 11/356,090.

U.S. Unpublished Appl. No. 11/356,053.

U.S. Unpublished Appl. No. 11/356,052.

The American Heritage College Dictionary, fourth edition, Houghton Mifflin Company, 2002, p. 842.

\* cited by examiner

TELEVISION INTEGRATED CHAT AND PRESENCE SYSTEMS AND METHODS

I. RELATED APPLICATIONS

The applications listed below are related to this application and are being filed on the same date as this application:

U.S. patent application Ser. No. 11/356,090, entitled "Systems and Methods for Providing Supplementary Television Content,";

U.S. patent application Ser. No. 11/356,053, entitled "Systems and Methods for Shared Viewing Via Television,";

U.S. patent application Ser. No. 11/356,052, entitled "Systems and Methods for Fantasy League Service Via Television,";

U.S. patent application Ser. No. 11/356,094, entitled "Systems and Methods for Providing a Personal Channel Via Television;"

U.S. patent application Ser. No. 11/356,092, entitled "Systems and Methods for Providing a Shared Folder via Television," and U.S. patent application Ser. No. 11/356,091, entitled "Systems and Methods for Voicing Text in an Interactive Programming Guide."

II. TECHNICAL FIELD

The present application is generally directed to communications networks having video transmission capabilities. The embodiments described herein are more specifically directed to systems and methods to receive and transmit enhanced television services over high bandwidth access networks.

III. BACKGROUND INFORMATION

Consumers and businesses today receive television services from a variety of sources. Using even the most basic television set, viewers can receive traditional television broadcasts via an antenna connected to the television set. The problems with traditional broadcast television are well known. To receive a television signal, the receiving antenna must be within the range of a broadcast transmitter, making it difficult to receive a signal in remote places. The quality of a broadcast picture can depend on the strength or position of the antenna, leading to fuzzy pictures and constant repositioning of the antenna. Furthermore, traditional broadcast television is limited to simple viewing. The television signal is received and a picture is displayed on the viewer's television. Aside from changing channels, there is no way for viewers to customize television content or to communicate with broadcasters.

Cable television and, later, satellite television were developed to solve some of the problems associated with traditional broadcast television. Cable television providers receive television content from a variety of programming sources and transmit the content via cables, such as coaxial cables, directly to subscribers' homes. In the home, a "set top box" is typically used to receive the cable signal and provide it to the televisions for display. Although cable television does not generally suffer from the picture quality problems of over-the-air broadcast television, the use of amplifiers to carry the cable signal over long distances can cause signal degradation and reliability problems. The typical cable set top box also offers limited options for customizing content because it relies on standard broadcast television content transmissions, has generally contained limited processing functionality and has limited network interactivity capabilities (e.g., pay-per-view requests, video on demand requests).

Satellite television provides high quality television picture because its signal travels through the air (i.e., a faster and more accurate delivery medium than cable) and it does not rely on an antenna's range to the content provider. Instead, satellite providers broadcast television content to a geosynchronous satellite that rebroadcasts the content to a satellite dish at a subscriber's home. The satellite dish is typically connected to a satellite receiver that decrypts and formats the television content and delivers it to the televisions for display. However, satellite television is not without its limitations. For example, like cable television services, satellite television relies on standard broadcast content transmissions. Furthermore, satellite receivers rely on low-bandwidth conventional "plain old telephone service" (POTS) telephone lines to provide a bidirectional communication path for requests from the satellite receiver and download of customized content, so download rates are slow and available content is limited.

Digital video recorders, available as standalone components or integrated in set top boxes and satellite receivers, enable viewers to record television content. Using a menu displayed on the television, viewers may be able to select programs to be recorded, order pay-per-view content, and set viewing preferences, such as parental controls. However, typical digital video recorders use low-bandwidth POTS phone lines as a bidirectional communication path to a cable, satellite or other service provider, limiting the ability to provide any content customized specifically for a particular user.

Over the years, broadcast, cable, and satellite television have steadily improved television picture quality and some providers have developed the capacity to deliver limited enhancements to video broadcast viewing, such as pay-per-view and video-on-demand. Digital video recorders enable viewers to receive content in a limited and delayed fashion. However, there remains a need for enhanced television services that are rich, reliable, and truly customized.

V. DETAILED DESCRIPTION OF PREFERRED EMBODIMENTS

Preferred methods and systems consistent with the present invention provide enhanced television services to subscribers using a high speed bi-directional connection such as a fiber optic network. A service provider transmits both general television content, such as broadcast television programs, and content that is customized for each subscriber. Subscribers communicate with the service provider to perform any number of tasks, including establishing an account, ordering customized content, and sharing content with other subscribers.

Reference will now be made in detail to various exemplary embodiments of the invention, examples of which are illustrated in the accompanying drawings. Wherever possible, the same reference numbers will be used throughout the drawings to refer to the same or like parts.

A. System Overview

Figure 1:
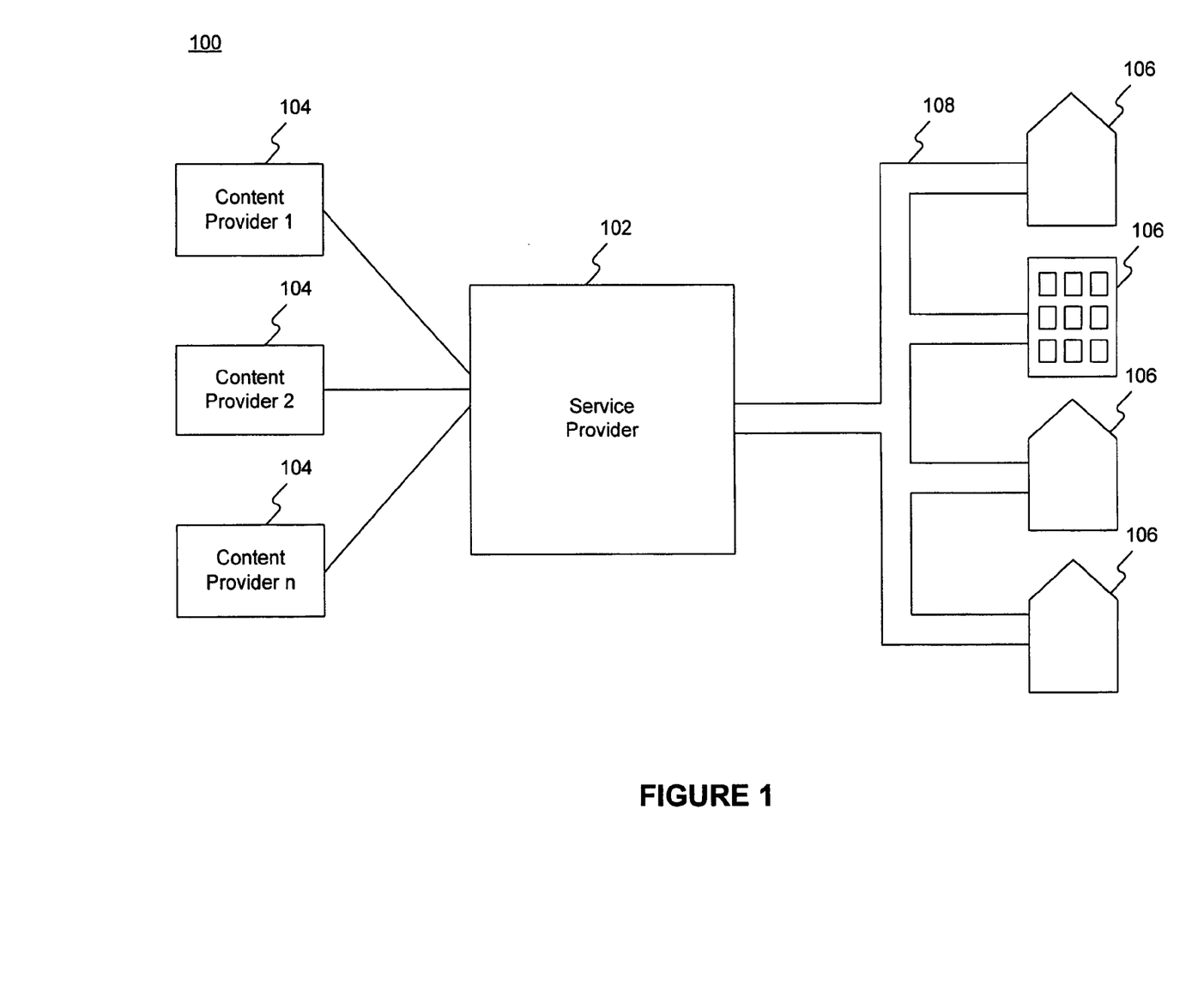
FIG. 1 is a block diagram of a system consistent with an exemplary embodiment of the present invention.

FIG. 1 is a block diagram of a system 100 consistent with a preferred embodiment of the present invention. A service provider 102 collects content (e.g., broadcast video, broadcast audio, audio/video on demand, data content), from a plurality of content providers 104. Such content may include, for example, programming from local broadcast television channels, programming from national broadcast television content providers such as Home Box Office or ESPN, and educational programming such as distance learning broadcasts. Service provider 102 transmits data, including the audio/video content, to subscribers 106 via an access network 108. Subscribers 106 may include homes, businesses, hotels, etc. In a preferred embodiment, access network 108 consists mainly of fiber optic cables and connectors, enabling high speed, two-way communication between service provider 102 and subscribers 106. Access network 108 may also include other networking technologies, such as wireless networking. In one embodiment, service provider 102 and subscribers 106 may also be able to communicate via alternate networks that may interconnect the service provider 102 and subscribers 106, such as the Internet (not shown).

Figure 2:
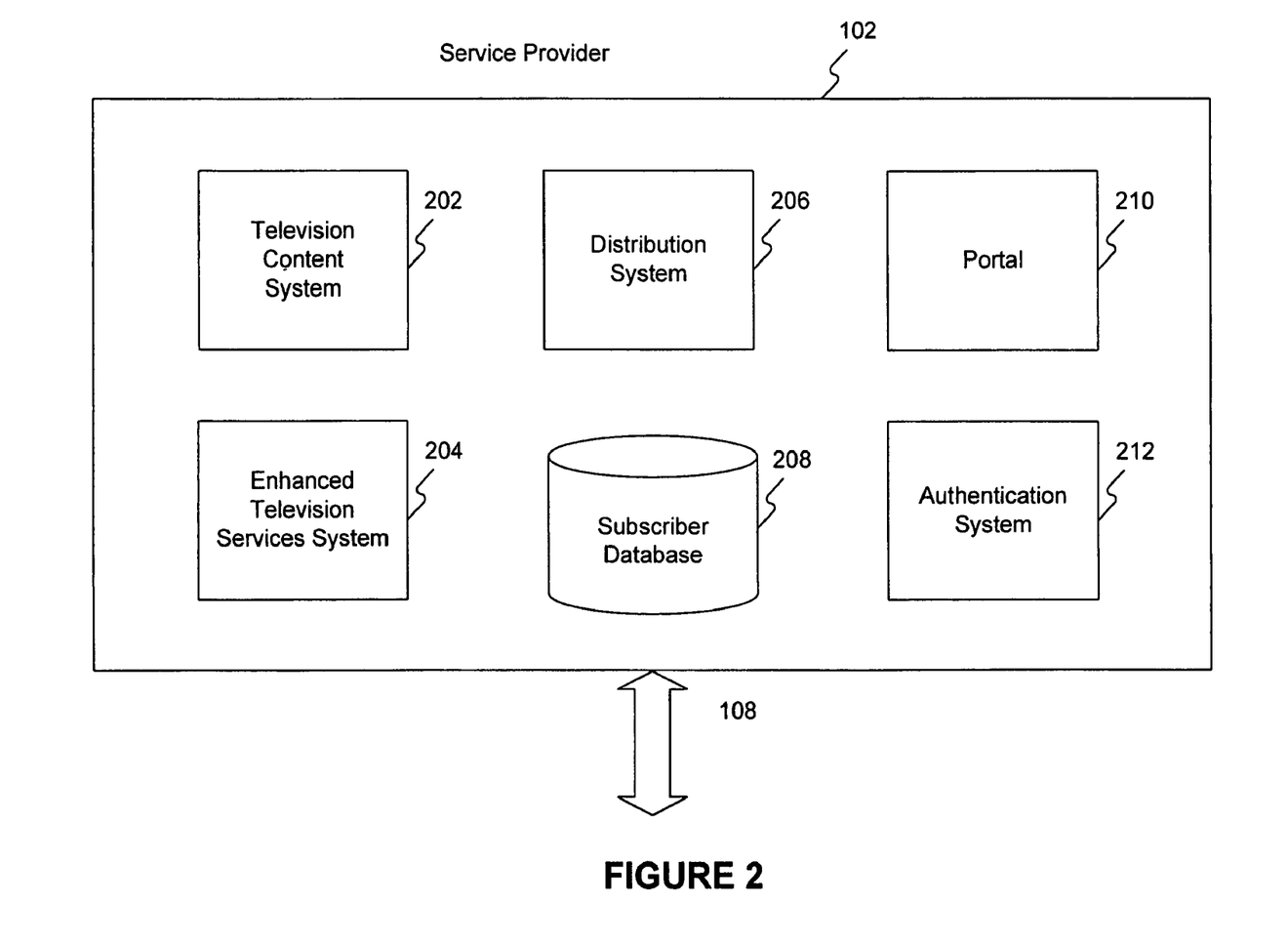
FIG. 2 is a detailed block diagram of a service provider consistent with an exemplary embodiment of the present invention.

FIG. 2 is a block diagram of a service provider 102 consistent with a preferred embodiment of the present invention. Service provider 102 may provide multiple services to subscribers 106. For example, service provider 102 may establish and maintain subscriber accounts, provide regular broadcast television programming, provide on-demand video content, enable subscriber feedback, etc. Service provider 102 may also enable subscribers 106 to obtain enhanced services, such as described below.

Exemplary service provider 102 may include various systems and facilities to receive, store, process and transmit content for provision to subscribers 106. For example, exemplary service provider 102 may include a television content system 202, an enhanced television services system 204, a distribution system 206, a subscriber database 208, a portal 210, and an authentication system 212. Television content system 202 may receive, store, process and transmit broadcast television content originated by content providers 104. In one embodiment, service provider 102 may also create television content and store and transmit such content using television content system 202. Enhanced television services system 204 may receive, store, process and transmit data to support enhanced television services and provide subscriber interfaces for accessing enhanced television services (as further discussed below).

Distribution system 206 may distribute content and data, e.g., from television content system 202 or enhanced television services system 204, to subscribers 106. Distribution system 206 may perform broadcast/multicast delivery (e.g., to send the same information to many subscribers simultaneously) or unicast delivery (e.g., to send customized content to a single subscriber). Distribution system 206 may also provide an "upstream" communications path from subscribers 106 to, for example, enhanced television services system 204, such that subscribers may send requests and other information related to obtaining customized content, among other things.

Subscriber database 208 may store data about subscribers 106 such as name, address, subscriptions to enhanced services, etc. Portal 210 may provide an interface for communications with service provider 102 via an external network, such as the public switched telephone network (PSTN) or a wide area network such as the Internet. Authentication system 212 may process authentication and/or authorization information to enforce security and privacy for providing services to subscribers 106.

A skilled artisan will recognize that service provider 102 may include more or fewer components than are shown in FIG. 2, and more or combined functionality compared to that illustrated in FIG. 2. For example, a separate database may be provided to store authentication information used by authentication system 212. In another example, service provider 102 may include telecommunications and/or conference bridge facilities to enable subscribers 106 to access audio/video telecommunications and/or teleconference services (e.g., available through enhanced television services). Additionally, the functionality of service provider 102 may be performed by a single system, or by a combination of computers and other equipment, which may be distributed over multiple locations and interconnected by various communications links. The operation of the components of service provider 102 is described in greater detail below.

Figure 3A:
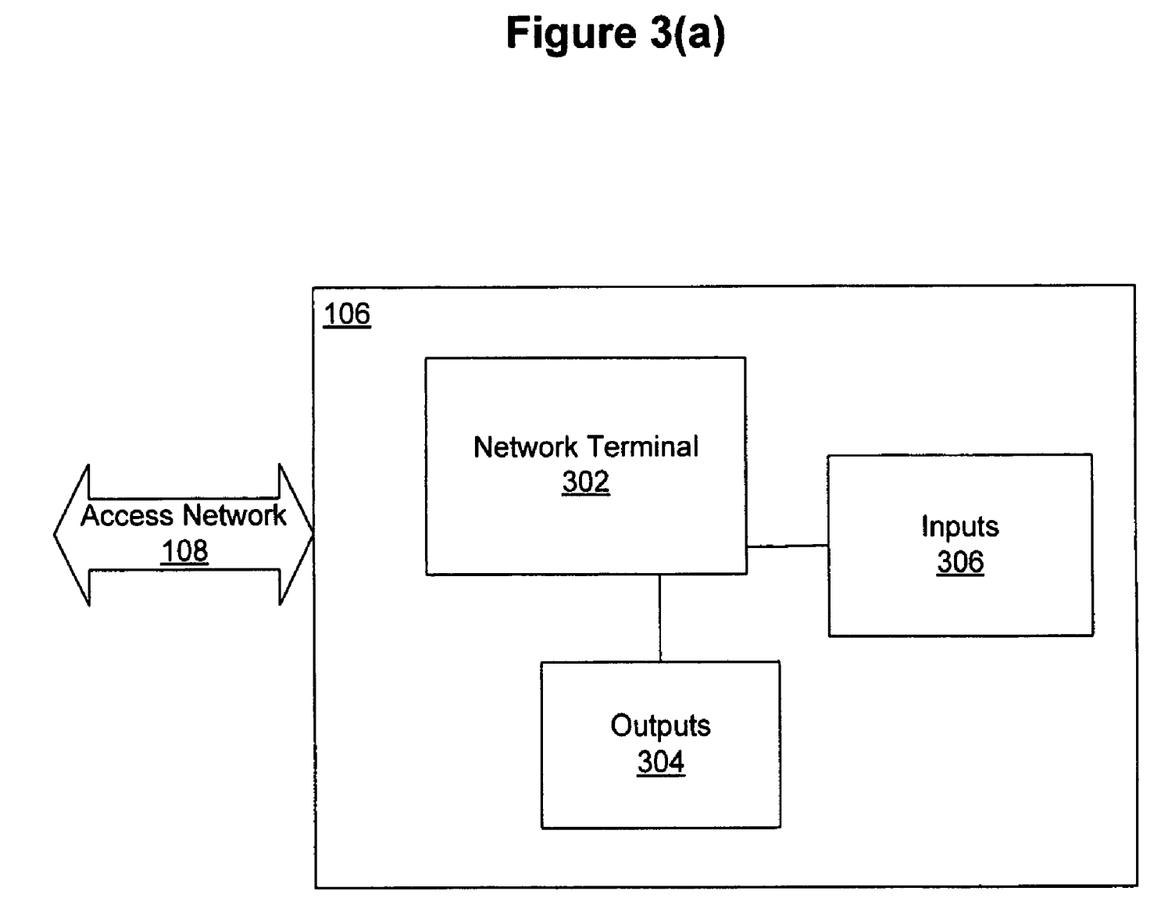
FIGS. 3(a) and 3(b) are detailed block diagrams of a subscriber consistent with an exemplary embodiment of the present invention.
Figure 3B:
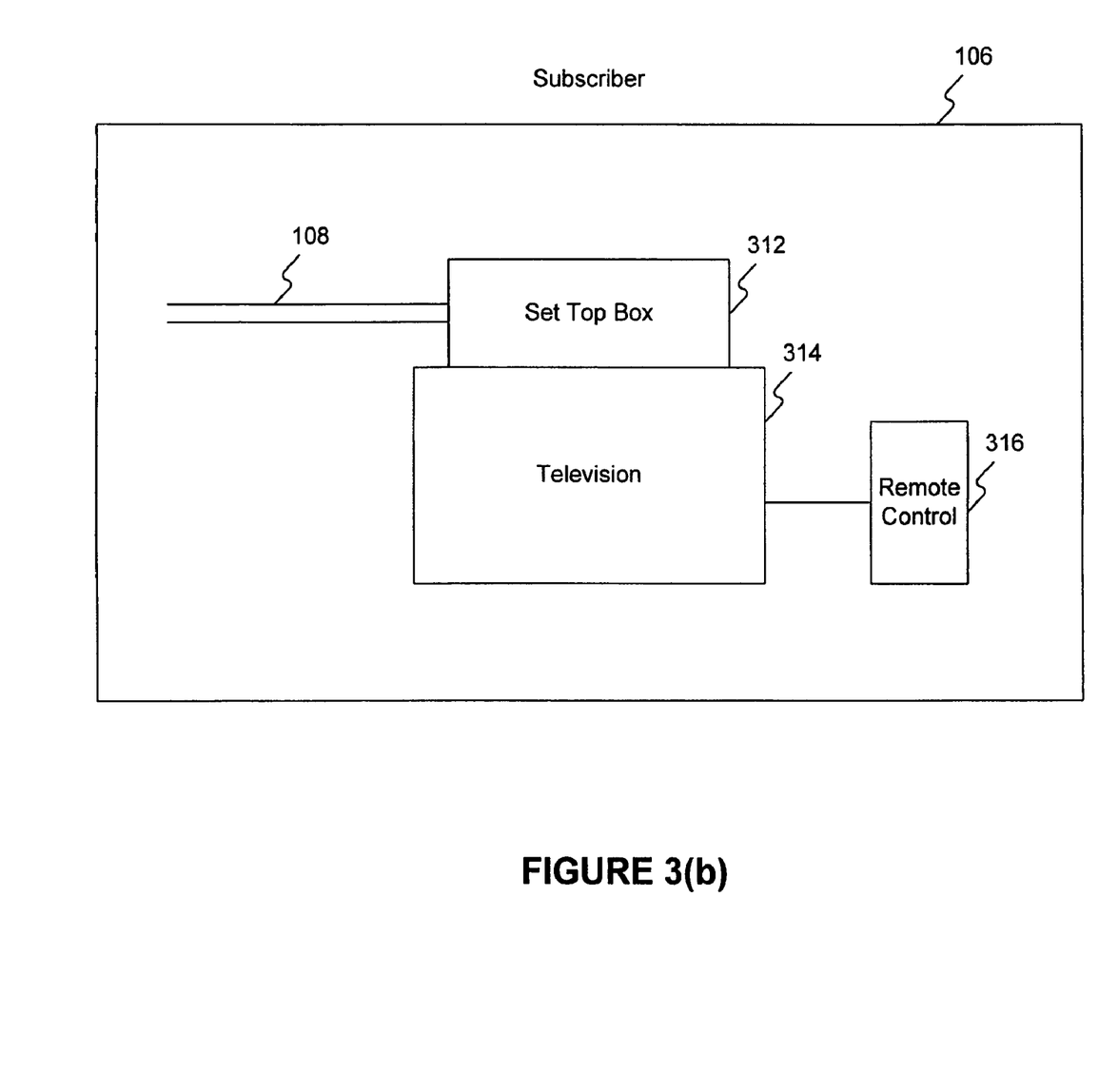

FIGS. 3(a) and 3(b) illustrate block diagrams of a subscriber 106 consistent with a preferred embodiment of the present invention. As shown in FIG. 3(a), subscriber 106 receives transmissions from service provider 102 via access network 108 at a network terminal 302. As described above, access network 108 may be, for example, a passive optical network (PON). The network terminal 302 may receive the network transmissions from service provider 102 via any number of intermediate components/technologies. For example, an optical-to-electrical conversion component may be interposed between the network terminal 302 and service provider 102 in order to convert optical transmissions to electrical signals (e.g., RF signals, POTS signals, Ethernet signals), as well as other transport components that may be deployed therebetween.

Network terminal 302 processes data received via access network 108 and presents it to output devices 304. As such, network terminal 302 may include processors, storage systems, network interfaces (e.g., to access network 108) and device interfaces, as generally known. Output devices 304 can include any number of components with the capabilities to output audio and/or video, such as video displays, speakers, television sets, etc. Network terminal 302 is also connected to one or more input devices 306, which allow users to provide input data, for example, to control the network terminal 302 or output devices 304, or provide data for upstream transmission over access network 108. Input devices 306 can include devices such as keyboards, pointing devices, remote controllers, touch screens, etc. In certain embodiments, network terminal 302 may be integrated with any or all of the output devices 304, as well as any or all of the input devices 306 (an example of which would be a mobile telephone). In some embodiments, subscriber 106 may also use a separate computing system or telecommunications device such as a telephone (not shown) connected to an external network (e.g., PSTN, Internet, wireless network) to communicate with service provider 102 (e.g., via portal 210).

FIG. 3(b) illustrates a specific embodiment relative to typical television service at a subscriber 106. As shown in FIG. 3(b), the network terminal is a set top box 312 connected to access network 108 (e.g., via various technologies/components) to communicate with service provider 102. Set top box 312 is connected to television 314, which includes facilities to display video and produce audio based on signals provided by set-top box 312. A remote control 316 and other input devices (e.g., pushbuttons) are provided and may be communicatively connected to television 314 and/or set-top box 312 (e.g., wirelessly) to enable a viewer to control television 314 and/or set top box 312, and to provide data which may be transmitted over access network 108 to service provider 102, and/or other subscribers 106.

Subscriber 106 may set up an account with service provider 102 which enables and/or controls the ability to receive enhanced television services. For example, the subscriber account may be used by provider 102 to store subscriber identification information, such as a name and address, store indications of which services a subscriber is authorized to receive, such as premium broadcast channels or Internet access, and track and bill for enhanced services, such as viewing of personalized content, etc. The account may also store an identifier of the subscriber's network terminal 302 that allows for identification of the network terminal over the access network 108 (e.g., a unique identifier of a set top box 312 assigned to the subscriber), facilitating the delivery of enhanced television services to the subscriber. Subscriber 106 may access account information, for example, using portal 210 via voice communications (e.g., an interactive voice response system) or data communications (e.g., an interactive web interface over the Internet). Alternatively, a subscriber may use a phone integrated into set top box 312 or controls available in remote control 316 to communicate with service provider 102 over access network 108.

Subscriber 106 may include several users and their equipment. For example, within a single household, different family members may desire to receive different content or subscribe to different enhanced television services from service provider 102. In one embodiment, a subscriber 106 (e.g., a household) may establish an account with service provider 102 and each user (e.g., family members in the household) is associated with that account and may have information stored in subscriber database 208. In another embodiment, each user may establish his own account with service provider 102.

Figure 4:
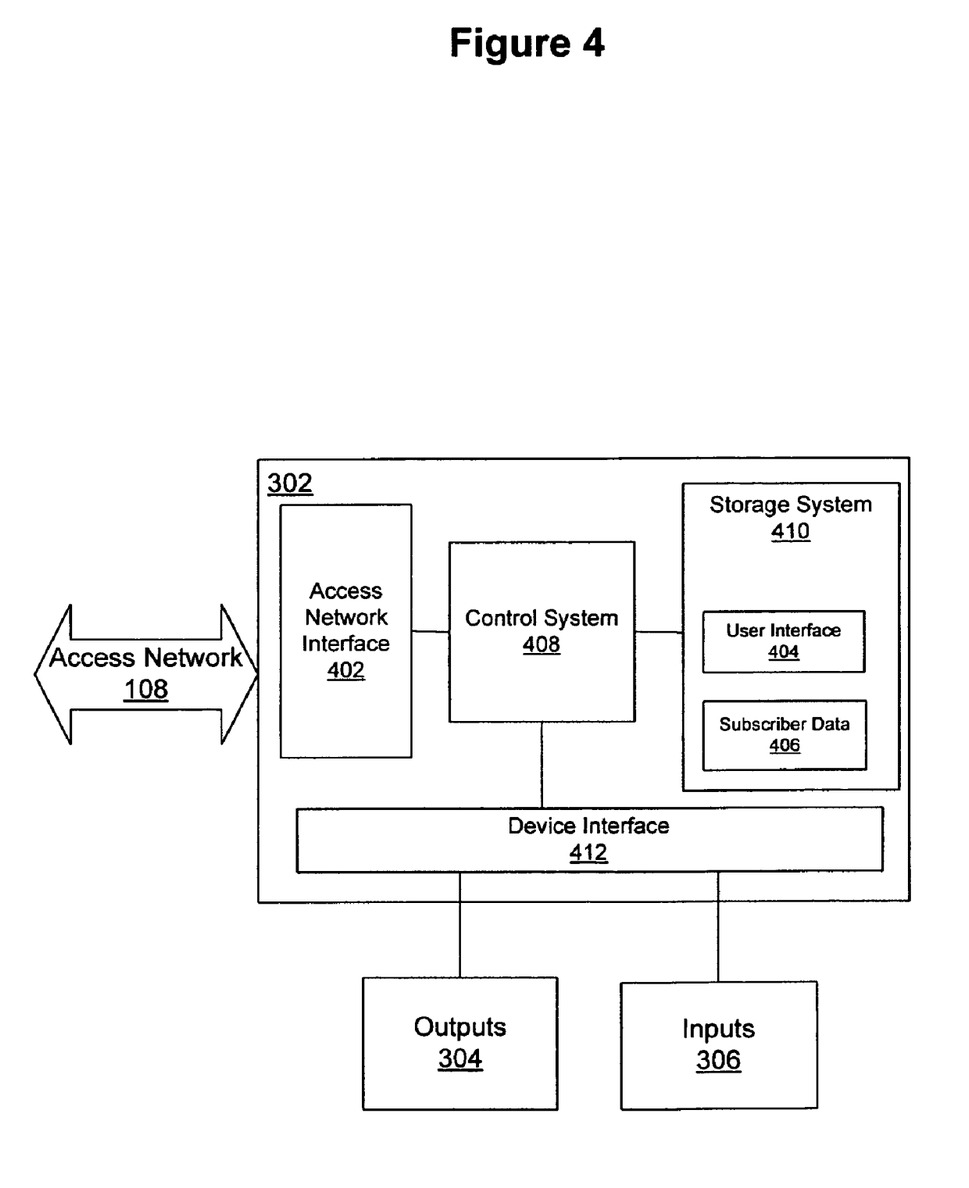
FIG. 4 is a detailed block diagram of a network terminal consistent with an exemplary embodiment of the present invention.

FIG. 4 is a detailed block diagram of a preferred network terminal 302 (such as set top box 312). Network terminal 302 may include an access network interface 402, control system 408, storage system 410 and device interface 412. Control system 408 may include processors or other control logic, which may be used to execute various instructions and manipulate data stored in storage system 410. Storage system 410 may include various storage devices and controllers, such as semiconductor memories (e.g. RAM, ROM, flash), magnetic memories (e.g., disk), optical memories (e.g., DVDs), memory controllers and/or other storage, as is well known. Device interfaces 412 may include various components to interface with external components, such as output devices 304 and input devices 306, as generally known.

Using the access network interface 402, network terminal 302 communicates with service provider 102 to send and receive high speed communications for television programming, enhanced television services, subscriber account management, etc., over access network 108. Access network interface 402 may include various components to allow for communications over access network 108 in one or more forms, depending on the implementation. For example, access network interface 108 may include an RF interface to receive RF signals and/or an optical interface to receive optical signals. Access network interface 402 may further include components to distinguish between and process various communications carried over access network 108. For example, access network interface 402 may include components to receive broadcast-television-formatted transmissions (e.g., NTSC, MPEG) and/or packet-data-formatted transmissions (e.g., Ethernet, IP). In some embodiments, access network interface 402 may also be connected to device interface 412, for example, to provide broadcast television transmissions to output devices 304.

Storage system 410 may include various modules executable by the control system 408 and implementing various features in preferred embodiments. For example, storage system 410 stores a user interface 404 comprising one or more displays (e.g., an interactive program guide) which may be provided on output devices 304 to enable subscriber 106 to communicate with network terminal 302, select content for viewing, access enhanced viewing features, etc. User interface 404 may include various user interfaces to utilize enhanced television services available through service provider 102, for example, downloaded from service provider 102. Subscriber data 406 may also be stored in storage system 410 to support enhanced television services. For example, a subscriber's viewing preferences or settings may be stored as subscriber data 406. In another example, subscriber data 406 may be stored outside network terminal 302, such as at service provider 102 (e.g., in subscriber database 208) or on a computing system or other device controlled by the subscriber (e.g., a smart card).

Network terminal 302 may include fewer or more components than are shown in FIG. 4, as is well known, and may be interconnected in various ways using buses, etc., as is well known.

B. Enhanced Television Services

A preferred embodiment uses a high-bandwidth bidirectional access network 108 to provide enhanced television services. For example, a service provider may provide a multitude of enhanced services to a subscriber by allowing the subscriber to connect with the service provider via such a high-bandwidth bidirectional access network to obtain, configure and control the delivery of desired television content and related services. A preferred embodiment utilizes a fiber optic access network, although other high-bandwidth technologies could also be used (e.g., RF wireless, RF over coaxial cables). Fiber optic connections provide much more bandwidth for transmitting data than conventional connections using radio waves or coaxial cable. Fiber, for example, can easily carry hundreds or even thousands of channels of television content, telephone services, and data services (e.g., Internet access). To leverage the additional bandwidth and quality of fiber connections, service providers may offer a wide range of enhanced television services to attract and retain subscribers.

Enhanced television services may include, for example, personalized television channels, synchronized sharing of personal content among subscribers, direct access to supplemental television content, integrated chat and presence information on television, and interactive entertainment. Subscribers may enjoy these services from their premises using familiar devices (e.g., a set-top box, a television, a remote control, etc.). In some embodiments, subscribers may have the option of using a computer or other device connected to the Internet to further customize or enhance television services.

C. Television Integrated Chat and Presence

One implementation of an enhanced television service provided by preferred systems and methods is television integrated instant message (IM) chat and presence capabilities.

Instant message chat allows users to send and receive communications using their television. According to a preferred embodiment, a portion of the television screen may be dedicated to sending and receiving instant messages while the rest of the screen may display a video transmission. The dedicated portion may be referred to as a window. The user may type and receive communications (e.g., lines of text) that are displayed in the window.

To facilitate instant messaging, a user may create a list of other users designated as "buddies." A user may exchange instant messages with selected buddies from the list, which may be displayed on the user's television screen. The list of names of buddies may include a user identification (e.g., a "screen name" or other user ID), and may also include user status information, such as presence status information that would allow a user to determine the presence status of another user. Presence status may include, for example, whether the other user is online (e.g., watching TV), offline (e.g., TV off), busy (e.g., watching TV, but not accepting messages), away, etc.

In some embodiments, online or offline may indicate whether a user is connected to the system or active with the system, e.g., interacting with the system controls, watching television, messaging, etc. Busy may indicate that the user is connected to the system but is not available for instant messages. For example, the user may be using a telephone or may have turned instant messaging off. Away may indicate that the user is connected to the system, but is away from the television. Processes may be implemented to detect user presence status and communicate changes in status within the messaging system.

Presence information on the buddy list may also include information identifying the video transmission (e.g., a television broadcast) that the user is watching or other information about the user's television watching session(s), such as last shows watched, length of viewing session, channel changing intervals, etc. Such information may be used in communications with other users. For example a user may send messages to the other users who are watching the same program, or invite other users to watch a program that the user recommends.

Instant messages may be transmitted from the originating user's network terminal 300, such as set top box 312, over access network 108. Such instant messages may contain the communication by the originating user, as well as user identification(s) for the destination user(s). The presence system may use the user identifications to determine appropriate destination set top boxes to receive the instant message, for example, by mapping the user identifications to a unique identifier associated with the user (e.g., a network address of a set top box associated with the user). Upon receiving the instant message, the set top box 312 for a destination user may cause the information in the instant message to appear in a designated portion of the television display, such as the bottom portion of the display, while the rest of the display shows the video transmission the user is currently receiving.

Table 1 illustrates exemplary buddy list information:

TABLE 1

| Buddy List | | |
|---|---|---|
| User | Presence Status | Program |
| John | Online | The Price Is Right |
| Amy | Offline | |
| Bill | Away | Wheel of Fortune |
| Jeff | Online | Wheel of Fortune |
| Jane | Busy | |

Figure 5:
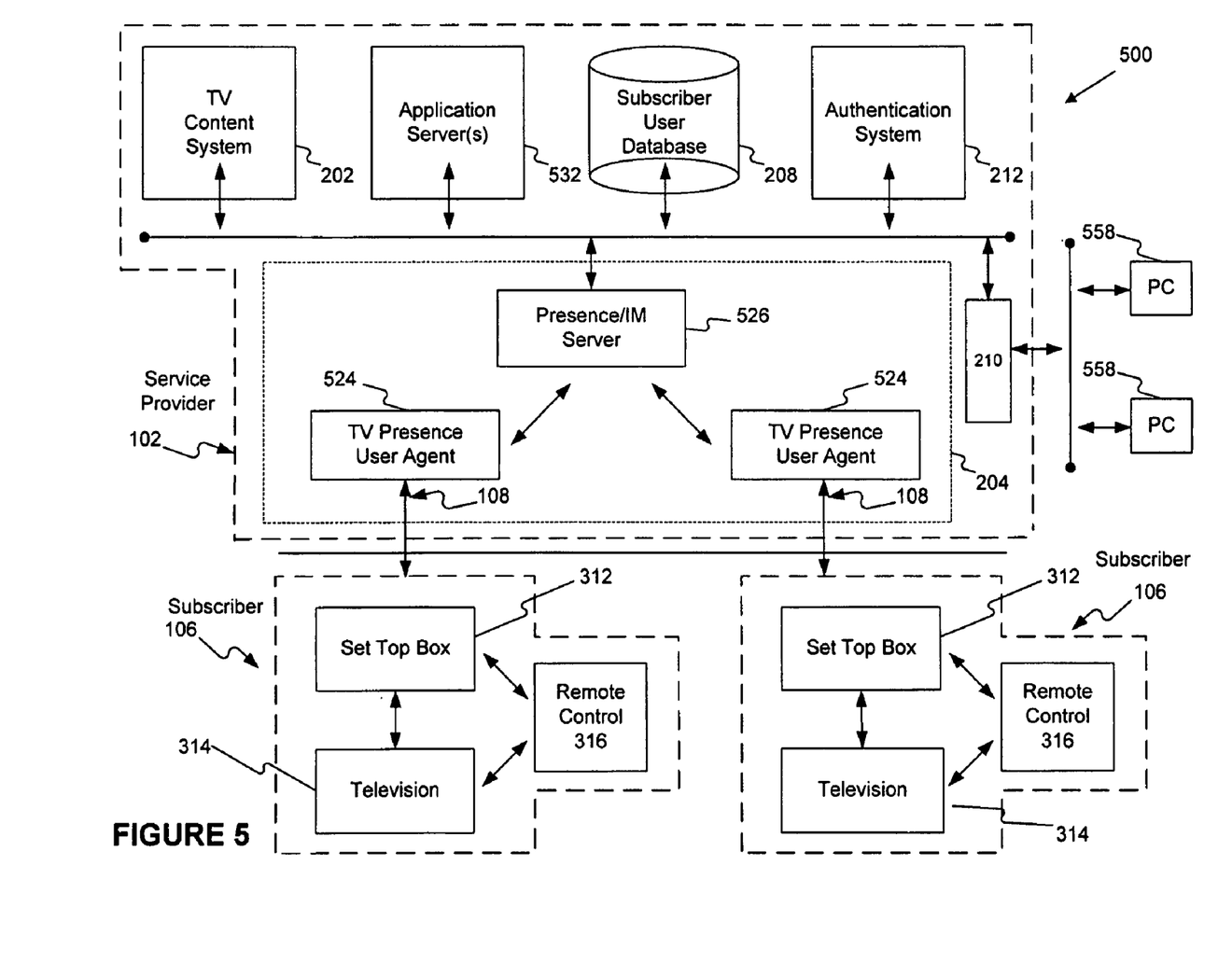
FIG. 5 is a detailed block diagram of a high-level architecture of a television integrated chat and presence system consistent with an exemplary embodiment of the present invention.

FIG. 5 is a detailed block diagram of a high-level architecture of an integrated IM and chat presence system 500, which is illustrated in the context of a system using set to boxes 312 as network terminals 302, televisions 314 as output devices 304, and remote controls 316 as input devices 306. As noted above, other configurations are possible. As shown, system 500 includes a service provider 102 that includes a television content system 202, a subscriber database 208, and an authentication system 212. System 500 also includes a presence/IM server 526 and TV presence user agents 524, which may be implemented as part of enhanced television services system 204. System 500 also includes a plurality of users or subscribers 106 each having a set top box 312, a remote control 316, and a television 314. A subscriber 106 is communicatively connected to service provider 102, for example, via access network 108 (e.g., a fiber optic network). System 500 may also include one or more computing devices (PCs) 558, which may be connected to service provider 102 via portal 210 and a wide area data network, such as the Internet.

In the embodiment shown, TV presence user agent 524 allows users 106 to communicate with presence/IM server 526 and consequently enables communication among instant message users using PCs 558, other users 106, and other presence-enabled devices accessible via system 500, such as telephones etc. (See, for example, Methods and Systems for Presence-Based Telephony Communications, U.S. patent application Ser. No. 10/627,368, filed Jul. 25, 2003, hereby incorporated herein by reference). In another embodiment, presence/IM server 526 may integrate with other existing IM and presence systems existing on both wired and wireless networks external to system 500 (e.g., via portal 210 over the external data network). System 500 may monitor the activity of subscriber 106 through the subscriber's TV presence user agent 524. User agents 524 may be deployed as software residing on user set top boxes 312, or may be deployed within service provider 102 (e.g., as a proxy), as shown in FIG. 5. As noted above, a user may compile a list of other users who are designated as buddies, called a buddy list, which may store presence information related to such users, for example, accessible by a users user agent 524. Presence/IM Server 526 and User Agents 524 can track and propagate presence status changes for users that a particular user has on his buddy list, and update the buddy list appropriately. Some embodiments may provide a user with the functionality of Presence Availability Management (PAM) and IM systems, including services for sending and receiving instant voice or text messages, making and receiving telephone calls and receiving voice alerts and notifications. (See, for example, the aforementioned patent application titled "Methods and Systems for Presence-Based Telephony Communications," U.S. patent application Ser. No. 10/627,368, filed Jul. 25, 2003.)

System 500 may keep track of each buddy who is online and what channel and program the buddy is watching. Subscriber 106 may invite an online buddy (or buddies) to watch a particular program using an instant message. The buddy may then select the message that appears on his television screen to automatically change the channel on his TV set to the program identified -in the instant message. In one embodiment, set top box 312 may store and modify presence status in real-time, including the television-control status of set top box 312, and communicate status information via notifications to presence/IM server 526 without user interaction. Such a configuration may enable presence/IM server 526 to generate notifications indicating a change in status information including, for example, a "channel changed" alert to be sent to other buddies.

In another embodiment, the functions and/or hardware of set top box 312 may be integrated into television 314. In yet another embodiment, remote control 316 may also be enabled to receive and display instant messages as an output device using, for example, an LCD display.

In another embodiment, presence/IM server 526 is configured to automatically group users who are watching the same program, forming an ad hoc buddy list based on a television-related action. Presence/IM server 526 may form other ad hoc buddy lists based on other television habits of users, such as frequent viewing times, channels, programs, networks, program genre, typical program demographics, location, etc. Subscriber 106 and the buddies on an ad hoc list may exchange instant messages.

Figure 6A:
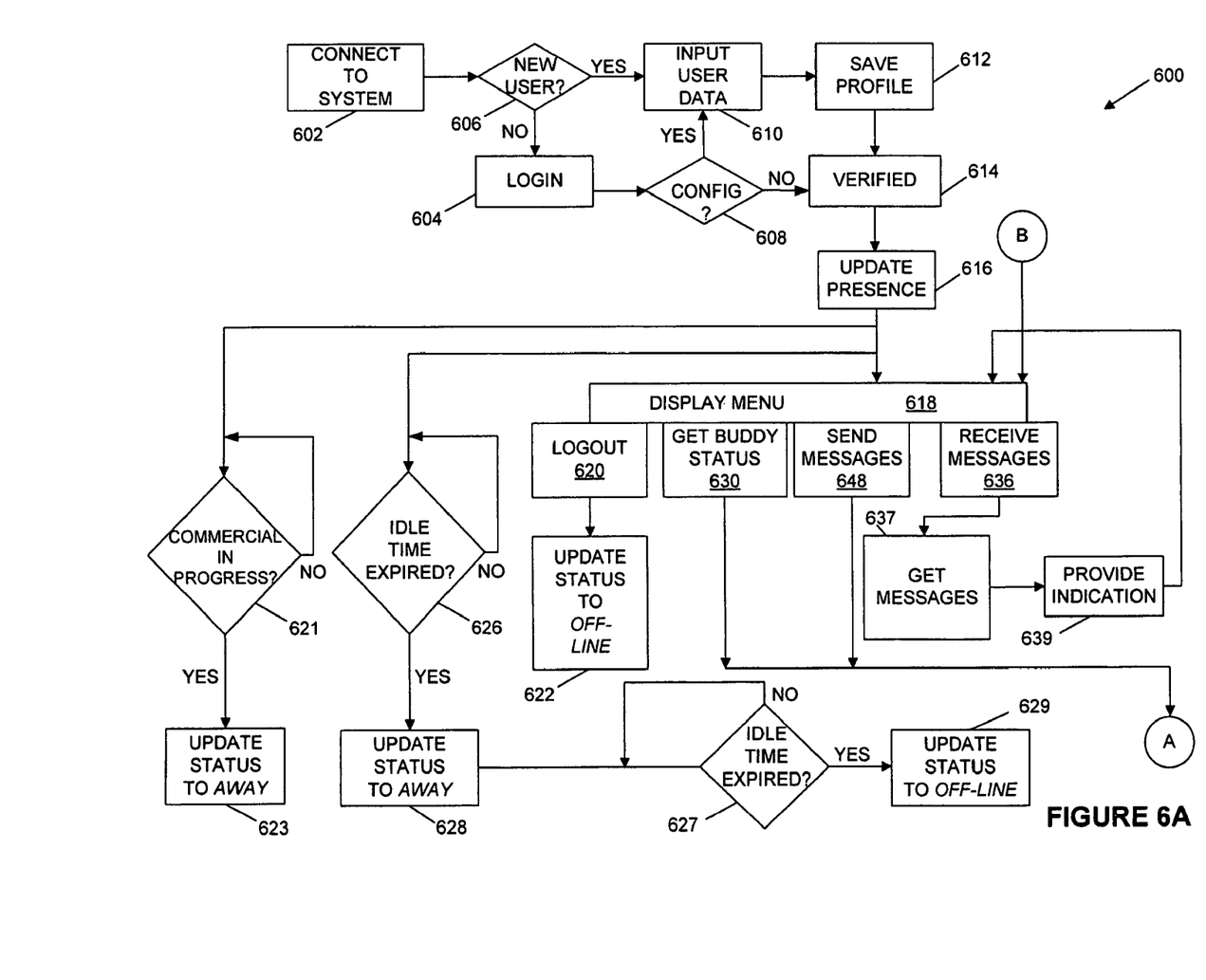
FIGS. 6A and 6B are flow charts of an exemplary method that illustrates the operation of the preferred system consistent with an embodiment of the present invention.
Figure 6B:
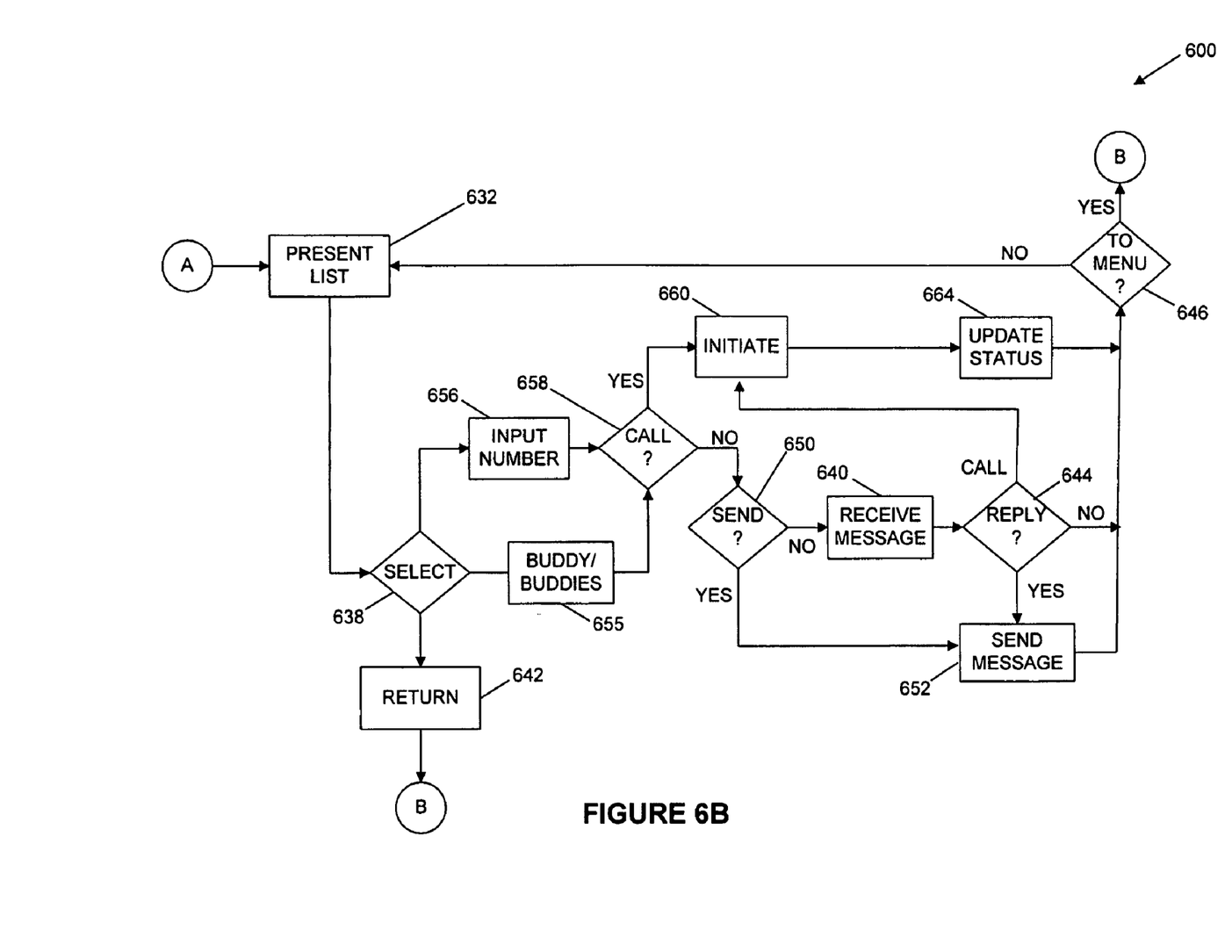

FIGS. 6A and 6B are a flow chart of an exemplary method 600 that illustrates the operation of system 500. To start, service provider 102 receives a connection signal (step 602) that may be initiated by subscriber 106. Subscriber 106 may initiate connection using remote control 316 or by another means such as controls on set top box 312. Using the connection signal, service provider 102 determines whether subscriber 106 is a new user (step 606). If so, service provider 102 receives user data (step 610) that is entered via set top box 312 by subscriber 106 using remote control 316 or the set top box controls. Service provider 102 then saves the user data from subscriber 106 in a user profile (step 612) that may include a user name, a password, a telephone number, etc. Once the profile is saved, service provider 102 verifies (step 614) the user data, for example, against the data in subscriber database 208 and/or via authentication system 212. Authentication allows subscriber 106 to gain access to various portions of the system 500 such as, for example, enhanced television services system 204.

Referring again to step 606, if the user is an established user (step 606), system 500 will log him in (step 604) using, for example, a user name (which may or may not be the same as the user identification used for messaging purposes) and password. Service provider 102 then gives subscriber 106 an option to configure (step 608) his user profile, such as by changing his password or specifying his presence status. Service provider 102 receives the user data (step 610) and continues by saving the updated user profile (step 612) and verifying the subscriber with authentication procedures (step 614). If the subscriber chooses not to update his profile or other information (step 608), system 500 performs the verification process (step 614). Once service provider 102 has verified subscriber 106, the presence status of the subscriber 106 is updated (step 616). As described previously, a user's presence status in the preferred embodiment may include online, offline, busy, or away statuses.

In one preferred embodiment, once a user is logged in, system 500 provides chat and presence capability as the user watches television using the network and equipment that provides the television signal. As the user watches television, system 500 monitors the user's activities and status, monitors the activities and status of other system users, interacts with the user through the user's television, and provides presence information and communication links among users.

For example, system 500 (e.g., via user agent 524) monitors a user's status by determining whether the user has used remote control 316 and/or set top box 312, for example, by monitoring whether an idle timer has expired (step 626). Remote control 316 or set top box 312 may be considered idle if they have not been used for a specified period of time. In such an embodiment, at or near expiration of the idle time (e.g., fifteen minutes from last user action), the user may be prompted to take action in order to preserve the user's status as "available." For example, a small picture representation serving as a warning of idle time expiration may be displayed by the set top box 312 on the television, partially obstructing the view of the current broadcast. Alternatively, a text message containing a warning may be displayed on the television screen indicating a pending user status change to "away" unless action is taken.

Upon seeing such notifications, the user may elect to preserve or reactivate "available" status by performing actions including, for example, changing channels, changing volume, or pushing an "I'm available" button on remote control 316. If the user takes no action, the user's status may be updated accordingly to "away" (step 528), for example, by a notification from user agent 524 to presence/IM server 526 indicating the change in status of the user. In the implementation shown, system 500 may further monitor whether user interaction occurs before another idle timer, for example a thirty minute timer, has expired (step 627) after the initial idle period. If the second idle time also expires without user activity, then a notification may be sent to presence/IM server 526 to update the subscriber's status to off-line (step 629). In one embodiment, a motion detector, seat sensor, or other sensor may be used to detect user activity or physical presence near a television set sufficient to prevent system 500 from updating the user's status based on idle time.

One of ordinary skill will recognize that other sensors and methods may be employed to monitor a user's status, for example, an IR sensor built into the television set to detect a user's body heat. For another example, sensors and/or software (e.g. software in the telephone call connection network) may detect that a user is speaking on a telephone, including a cell telephone, and the system may change the user's status to busy during the duration of the call. For yet another example, sensors and/or software (e.g., an application running on a networked computer) may detect when a user is interacting with a personal computer, and the system may change the user's status to busy during the interaction. For yet another example, sensors and/or software (e.g., an application running on a computer-controlled appliance) may detect when a user is interacting with an appliance, such as a microwave oven or refrigerator, and the system may change the user's status to busy during the interaction.

System 500 may also update a user's presence status based on the status of a television program that the user is tuned to. For example, system 500 may determine whether a commercial break (i.e., an advertising segment that is not part of the television show) is in progress during a program being displayed on the television (step 621), and if so, may change the subscriber's presence status to "away" during the commercial break (step 623) on the assumption that the user is not attentively watching the television during a commercial break. When the commercial break ends, system 500 may update the subscriber's status to online, busy, or whatever is appropriate for the user.

In the embodiment shown, a user may interact with system 500 through on-screen menus displayed by set top box 312 on television 314 (e.g., using user interface 404), including a menu for controlling chat and presence features and functions. For example, as represented in FIG. 6A, a menu may be displayed by set top box 312 on television 314 having a number of items related to communication and presence (step 618). A user may select a menu item using a remote control, television controls, or set top box controls. For example, when a subscriber selects "logout" (step 620) from a menu, a notification may be sent from user agent 524 to presence/IM server 526 in order to update the subscriber's status to offline (step 622) in database 208, and propagate the new status to other relevant subscribers through TV presence user agents 524.

As shown, if a subscriber 106 selects "get buddy status" (step 630), or selects "send messages" (step 648) from the menu, system 500 will display a list of the subscriber's buddies on the subscriber's television (step 632, FIG. 6B). The list may include such information as their presence status and what channel and program a buddy is watching. As described previously, Table 1 represents exemplary buddy list information, which may be stored in (or accessible to) user agent 524.

If a subscriber selects the IM menu item "receive messages," (step 636), system 500 determines whether there are messages for the subscriber (step 637). If there are no messages, system 500 will provide an appropriate indication (step 639), such as displaying an icon or text on the television, and continue displaying the menu (step 618). If there are messages, system 500 will provide an indication by, for example, displaying them (step 639).

Referring now to FIG. 6B, for the "send messages" and "get buddy status" processing in the embodiment shown, system 500 allows the subscriber to select from three options (step 638) after displaying the buddy list: 1) return to the previous menu, 2) select from the list of buddies, or 3) input a phone number. If "return" 642 is chosen, system 500 returns subscriber 106 to the menu (step 618, FIG. 6A). If the "input a phone number" option is selected (step 656), system 500 prompts the user to input a phone number of a buddy he wishes to telephone. When user 106 has input a buddy's phone number, system 500 may directly connect user 106 to the buddy via telephone.

If the buddy option is selected (step 655), for example by selecting a name from the list of buddies present, system 500 may access profile information about that buddy and present it to the user. In one embodiment, telephone information for the selected buddy may be present in the profile and usable by the system for placing calls between buddies, but hidden from the users in order to protect privacy. Once user 106 selects a buddy from the list, system 500 may give user 106 the option to call (step 658) the selected buddy on the telephone. Alternatively, if the selected buddy has not enabled telephone functionality, or in addition, user 106 may be given the option to message the selected buddy. If the option to call is chosen, system 500 may prompt user 106 to input a preferred phone number from which to make a call (e.g., user's cell phone number) if more than one telephone number is in the buddy's profile. Alternatively or in addition, system 500 may prompt the selected buddy with a request indicating a user's desire to have a phone conversation, for example, via a pop-up window on the buddy's television screen. Upon accepting the request, the buddy may be prompted to enter a preferred number on which to receive a phone call (e.g., their home telephone number), and the number may not be revealed to the requesting user unless the buddy allows it. In one embodiment, similar processing may be used to set up a conference call among more than two users.

After the buddy's telephone number is specified, system 500 then connects user 106 and the selected buddy via telephone. Thus, in this embodiment, two buddies may protect the privacy of their phone numbers yet still participate in a telephone conversation. Moreover, users do not have to remember, or even know, another user's telephone number in order to make a telephone call. And, for ad hoc groups of buddies, it is likely that the users do not know each other, or detailed information about each other such as telephone numbers.

In one embodiment, a subscriber's telephone service may be provided over, and integrated with, the same access network (e.g., a fiber optic network) that provides television services. In this embodiment, the service provider may place the call and route it to the calling subscriber's telephone, cell phone, etc., or to the calling subscriber's television, which may be equipped with microphones, speakerphones, etc. to enable telephone communication without a traditional telephone handset.

Referring again to step 658 of FIG. 6B, if the subscriber chooses not to use the integrated telephoning feature, or if the selected buddy has disabled such functionality, the subscriber may send a message, such as an instant text message, to the selected buddy(ies) (step 650, yes). In this case, system 500 presents an interface for composing and sending an IM message (step 652). For example, set top box 312 may open an online chat window on the subscriber's television 314. Subscriber 106 may then write and send IM messages to the buddy or buddies selected in step 655, which will appear in a window on the buddy(s) television. Text may be entered using, for example, a television remote control, a special-purpose keypad, or a voice-recognition application. In the message, subscriber 106 may invite an online buddy to watch a particular program, and the buddy may use the received IM message to change the channel to the program, for example by selecting the channel or program name in the IM message displayed on the receiving television screen using a remote-controlled cursor. Alternatively, the subscriber may select messages from a pre-populated list for sending to the recipient. After the message has been sent, system 500 gives subscriber 106 the option to work with the menu or the list of present buddies (step 646).

Referring again to step 650, if subscriber 106 chooses not to send an instant message, system 500 checks for received messages (step 640). In the implementation shown, subscriber 106 has three reply options after checking for received messages (step 644). If subscriber 106 chooses not to reply or no messages were received (step 644, No), the subscriber may return to the menu or the present buddies list (step 646). If subscriber 106 chooses to reply by a phone call (step 644, call), system 500 initiates the call (step 660), updates the subscriber's status (step 664), and then gives subscriber 106 the option to return to the menu or the current buddies list (step 646). If subscriber 106 chooses to reply by message (step 644, Yes), system 500 presents an interface for sending a message (step 652) as described above. After a message has been sent, the subscriber is given the option to return to the menu or continue working with the buddy list (step 646).

One of ordinary skill will recognize that the process shown in FIGS. 6A and 6B may have steps added, deleted, or modified. For example, the steps related to telephoning a buddy may be deleted. For another example, receive messages processing (step 636) may be modified so the process performs it automatically and not just when prompted by a menu selection.

Figure 7:
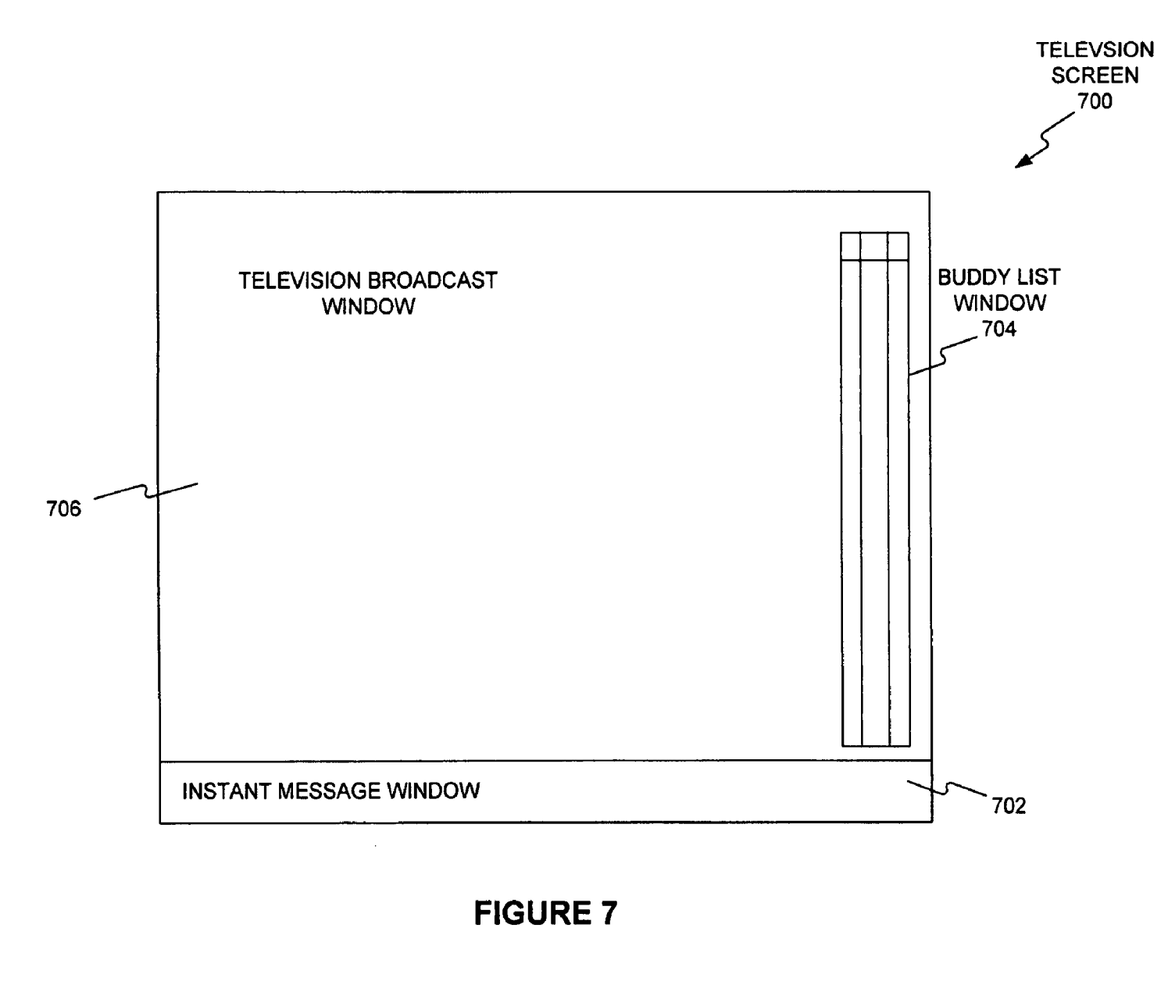
FIG. 7 is an exemplary television screen illustrating an instant message window, buddy list window, and television broadcast window consistent with an embodiment of the present invention.

FIG. 7 illustrates an exemplary television display supporting the preferred IM system. As shown, television screen 700 including an instant message window 702, a buddy list window 704, and the television broadcast window 706. In one embodiment, the television screen 700 may show the television broadcast window 706 without the instant message window 702 or the buddy list window 704, as the user may activate or deactivate these windows.

In other embodiments, a translucent instant message window 702 and/or buddy list window 704 may be superimposed over the television broadcast window 706 so that the user may still see the television broadcast behind these windows. In yet another embodiment, instant message window 702 may be implemented with text that scrolls at the bottom of the television screen 700 thereby allowing the user to view the television broadcast window 706 behind the text. In another embodiment, the communication session may include multiple simultaneous users, with each user's messages possessing identifying attributes including, for example, a color, an icon, and a name.

Yet another embodiment may include a remote control which can both send and receive information from the set top box, such as text messages, and display that information on a display integrated with the remote control, such as a two inch square LCD screen.

Although the implementations used as examples herein utilize instant messaging, other embodiments and implementations within the invention's scope may use other forms of messaging, such as email, video conferencing, video clips, telephone calls, radio transmissions, etc., sent and/or received via users' televisions.

Other embodiments of the invention will be apparent to those skilled in the art from consideration of the specification and practice of the preferred embodiments disclosed herein. It is intended that the specification and examples be considered as exemplary only, with a true scope and spirit of the invention being indicated by the following claims.

What is claimed is:

1. A method, comprising:
    receiving a first video transmission at a network terminal of a first user;
    displaying the first video transmission to the first user;
    receiving a request at the network terminal to send a communication;
    displaying, to the first user in response to the received request, information identifying a second user and a status of the second user, wherein the information is displayed to the first user simultaneously with the first video transmission;
    receiving the communication and a destination of the communication from the first user, the destination including an identification of the second user;
    sending a first message, the first message including the identification of the second user, the communication, and data identifying the first video transmission; and
    detecting a change in a status of the first user, the detecting comprising:
        detecting whether the first user has used the network terminal within a specified period of time;
        detecting whether a commercial break is in progress in the first video transmission displayed to the first user;
        prompting the first user to act when the first user has not used the network terminal within the specified period of time;
        changing the status of the first user when the first user fails to act in response to the prompting; and
        modifying an availability of the first user to receive messages when the commercial break is in progress.

2. The method of claim 1, wherein displaying the information includes displaying information identifying a second video transmission being provided to the second user.

3. The method of claim 1, wherein the status of the second user is a presence status.

4. The method of claim 1, further comprising:
    sending a notification including the change in the status.

5. The method of claim 4, wherein the change in status is at least one of a change in video transmission and a change in presence status.

6. The method of claim 5, wherein detecting the change in the status of the first user includes:
    detecting when the first user receives a third video transmission different from the first video transmission.

7. The method of claim 1, further comprising:
    receiving a notification including a change of status of the second user; and
    storing the change of status of the second user.

8. The method of claim 7, wherein the status of the second user includes at least one of a change in video transmission and a change in presence status.

9. The method of claim 1, wherein the first video transmission is a broadcast television program.

10. The method of claim 1, wherein the interface includes information identifying a third user and a status of the third user, the third user being different than the first user and the second user, wherein the destination includes an identification of the third user, and wherein the first message further includes an identifier of the third user.

11. The method of claim 1, further comprising:
    receiving a second message, the second message including information identifying a third video transmission;
    displaying, with the first video transmission, the information identifying the third video transmission;
    receiving a selection of the information identifying the third video transmission;
    receiving the third video transmission; and
    displaying the third video transmission.

12. A method, comprising:
    transmitting a first video transmission to a first user of a plurality of users and a second video transmission to a second user of the plurality of users;
    detecting whether a commercial break is in progress in the first video transmission;
    receiving a first notification including an indication of a change in status of the first user;
    storing the change of status of the first user in a record associated with the first user; and
    transmitting a second notification to the second user, the second notification reflecting the change of status of the first user,
    wherein:
        the change of status of the first user includes information identifying the first video transmission and a presence status of the first user indicating an availability of the first user to receive messages,
        the presence status of the first user indicates whether the first user has been idle for a specific period of time and whether the first user has responded to a prompt for action when the first user has been idle for the specified period of time, and the storing comprises modifying the availability of the first user to receive messages when the commercial break is in progress.

13. The method of claim 12, further comprising:
receiving a message, the message including an identifier of the second user, a communication to the second user and information identifying the first video transmission; and
transmitting the message to the second user.

14. The method of claim 12, wherein the presence status further includes one of "online," "away," and "offline."

15. The method of claim 12, wherein at least one of the first video transmission and second video transmission is a broadcast television program.

16. The method of claim 12, further comprising:
determining a subset of the plurality of users based on at least one attribute common to each user of the subset; and
sending a list of the subset of users to each of the users in the subset.

17. The method of claim 12, further comprising:
detecting a change in status of the second user;
storing the change of status of the second user in a record associated with the second user; and
transmitting a third notification to the first user including the change of status of the second user,
wherein detecting the change in status of the second user includes at least one of:
detecting whether the second user is using a telephone;
detecting whether the second user receives a third video transmission different from the second video transmission; and
detecting whether a commercial break is in progress in the second video transmission.

18. A communication system, comprising:
a server configured to enable a first user to communicate with a second user via a television and to transmit a television broadcast;
a television control processor configured to present, with the television broadcast, and upon command from the first user, a list including information identifying the second user; and
a module configured to transmit, using the information from the list, a message to the second user including data regarding the television broadcast;
wherein the television control processor is further configured to output a presence status of the second user, the presence status indicating an availability of the second user to receive messages, and the presence status further indicating whether the second user has been idle for a specific period of time and whether the second user has responded to a prompt for action when the second user has been idle for the specified period of time,
and further wherein the television control processor is configured to detect whether a commercial break is in progress in a television broadcast presented to the second user and to modify the availability of the second user to receive messages when the commercial break is in progress.

19. The communication system of claim 18, wherein the television control processor is further configured to present information regarding the television broadcast being watched by the second user.

20. The communication system of claim 19, wherein the television control processor is further configured to modify the list after the second user changes to a different television program.

21. The communication system of claim 19, wherein the television control processor is further configured to modify the presence status based on:
detecting whether the second user is using a telephone.

22. The communication system of claim 18, further comprising a second television control processor configured to set a television channel on a television of the second user based on the data regarding the television broadcast in the sent message.

23. The communication system of claim 18, wherein the server is further configured to enable the first user to invite the second user to watch the television broadcast using the message.

24. A communications device, comprising:
a device interface module configured to present a video transmission to an output device;
a processor configured to present, with the video transmission and upon command from a first user, information identifying a second user and a status of the second user; and
a network interface module configured to transmit, using the presented information, a message to the second user, the message comprising the identification of the first user, the status of the first user, and data identifying the video transmission;
wherein the processor is further configured to detect a change in a status of the first user, the detection comprising:
detecting whether the first user has been idle for a specified period of time;
detecting whether a commercial break is in progress in the video transmission displayed to the first user;
prompting the first user to act when the first user been idle for the specified period of time;
changing the status of the first user when the first user fails to act in response to the prompting; and
modifying an availability of the first user to receive messages when the commercial break is in progress.

25. The communications device of claim 24, further comprising an input device communicatively coupled to the device interface module and configured to enable the first user to enter data.

26. The communications device of claim 24, wherein the command comprises a request for communication.

27. The communications device of claim 24, wherein the processor is further configured to receive a communication from the first user, and wherein the message further comprises the received communication.

28. The communications device of claim 24, further comprising:
a storage device coupled to the processor and configured to store one or more of a status of the first user and the status of the second user.

29. The communications device of claim 24, wherein the processor is further configured to receive a notification comprising a change of status of the second user, the change in status comprising one or more of a change in video transmission and a change in presence status.

30. The communications device of claim 24, wherein the change in the status of the first user comprises a change in video transmission.

* * * * *